US012695206B2

(12) United States Patent
Lee et al.

(10) Patent No.: US 12,695,206 B2
(45) Date of Patent: Jul. 28, 2026

(54) BROADBAND WAVEPLATE DEVICE BASED ON OPTICAL PHASE MODULATION AND FABRICATION METHOD THEREFOR

(71) Applicant: UNIST(ULSAN NATIONAL INSTITUTE OF SCIENCE AND TECHNOLOGY), Ulsan (KR)

(72) Inventors: Jong Won Lee, Ulsan (KR); Hyeong Ju Chung, Ulsan (KR)

(73) Assignee: UNIST (ULSAN NATIONAL INSTITUTE OF SCIENCE AND TECHNOLOGY) (KR)

( * ) Notice: Subject to any disclaimer, the term of this patent is extended or adjusted under 35 U.S.C. 154(b) by 369 days.

(21) Appl. No.: 18/272,081

(22) PCT Filed: Jan. 7, 2022

(86) PCT No.: PCT/KR2022/000308
§ 371 (c)(1),
(2) Date: Nov. 2, 2023

(87) PCT Pub. No.: WO2022/154390
PCT Pub. Date: Jul. 21, 2022

(65) Prior Publication Data
US 2024/0305009 A1 Sep. 12, 2024

(30) Foreign Application Priority Data
Jan. 12, 2021 (KR) ........................ 10-2021-0004211

(51) Int. Cl.
*H01Q 15/22* (2006.01)
*G02B 26/06* (2006.01)
(Continued)

(52) U.S. Cl.
CPC ............. *H01Q 15/22* (2013.01); *G02B 26/06* (2013.01); *G02F 1/017* (2013.01); *H01Q 19/195* (2013.01)

(58) Field of Classification Search
CPC ...... H01Q 15/22; H01Q 19/195; G02B 26/06; G02F 1/017
(Continued)

(56) References Cited

U.S. PATENT DOCUMENTS

2013/0044318 A1    2/2013   Cho et al.
2015/0117015 A1    4/2015   Roh et al.
(Continued)

FOREIGN PATENT DOCUMENTS

JP          09-061767 A       3/1997
JP          2010097032 A      4/2010
(Continued)

OTHER PUBLICATIONS

International Search Report and Written Opinion for PCT/KR2022/000308, mailed Apr. 18, 2022.
(Continued)

*Primary Examiner* — William Choi
(74) *Attorney, Agent, or Firm* — Klarquist Sparkman, LLP

(57) ABSTRACT

Provided are a broadband waveplate device having a simple configuration and being capable of precisely performing optical modulation and a method of fabrication the broadband waveplate device, the broadband waveplate device including a first conductive layer, a multiple-quantum-well layer in which well layers and barrier layers are alternately stacked, disposed on the first conductive layer, and an antenna layer disposed on the multiple-quantum-well layer and having a shape of a plurality of stripes parallel to one another.

15 Claims, 13 Drawing Sheets

(51) Int. Cl.
    *G02F 1/017*     (2006.01)
    *H01Q 19/195*     (2006.01)

(58) Field of Classification Search
    USPC ................................................. 359/245, 279
    See application file for complete search history.

(56)               References Cited

U.S. PATENT DOCUMENTS

| | | |
|---|---|---|
| 2017/0031183 A1 | 2/2017 | Han et al. |
| 2018/0196137 A1 | 7/2018 | Lee et al. |
| 2020/0083669 A1 | 3/2020 | Na et al. |

FOREIGN PATENT DOCUMENTS

| | | | | | |
|---|---|---|---|---|---|
| KR | 2013-0019495 A | | 2/2013 | | |
| KR | 20150050093 A | | 5/2015 | | |
| KR | 20170013147 A | | 2/2017 | | |
| KR | 20180082305 A | * | 7/2018 | ........... | G02F 1/0305 |
| KR | 102040878 B1 | * | 11/2019 | ........... | G02F 1/3501 |
| KR | 20200030381 A | | 3/2020 | | |

OTHER PUBLICATIONS

Notice of Allowance for Korean Patent Application No. 10-2021-0004211, mailed Mar. 24, 2023 (w/English translation).
Office Action for Korean Patent Application No. 10-2021-0004211, mailed Aug. 29, 2022 (w/English translation).

\* cited by examiner

TCL
MQL
CL2b
CL2a
CL1

BROADBAND WAVEPLATE DEVICE BASED ON OPTICAL PHASE MODULATION AND FABRICATION METHOD THEREFOR

CROSS REFERENCE TO RELATED APPLICATIONS

This is the U.S. National Stage of International Application No. PCT/KR2022/000308, filed Jan. 7, 2022, which in turn claims priority to Korean Patent Application No. 10-2021-0004211, filed Jan. 12, 2021, which applications are incorporated herein in their entireties.

TECHNICAL FIELD

One or more embodiments relate to a broadband waveplate device based on optical phase modulation and a method of fabrication the same, and more particularly, to a broadband waveplate device, which has a simple configuration and may be used for phase modulation and a broadband waveplate using the phase modulation according to applied voltages, and a method of fabrication the broadband waveplate device.

BACKGROUND ART

Due to limitations in operation wavelengths usable for optical devices, different optical devices are required according to operation wavelength ranges, and it is not easy to implement optical devices configured to operate in a wide wavelength band. For example, modulation may be performed as desired with respect to light in certain wavelength ranges to implement optical devices actually having preset characteristics, but the light may not be modulated as desired even when there is a small change in wavelength.

DISCLOSURE

Technical Problem

The present disclosure provides a broadband waveplate device having a simple configuration and usable for accurate optical modulation and a broadband waveplate using the optical phase modulation according to applied voltages, and a method of fabrication the broadband waveplate device. However, the technical goal is only an example and the scope of the present disclosure is not limited thereto.

Technical Solution

According to an aspect of the present disclosure, a broadband waveplate device includes a first conductive layer, a multiple-quantum-well layer in which well layers and barrier layers are alternately stacked, disposed on the first conductive layer, and an antenna layer disposed on the multiple-quantum-well layer and having a shape of a plurality of shapes parallel to one another.

The antenna layer may have a shape in which ends at one side of the plurality of stripes are connected to one another and ends on another side of the plurality of stripes are connected to one another.

The antenna layer may be integrally formed as a single body.

The multiple-quantum-well layer may be patterned in a shape corresponding to the shape of the antenna layer.

The broadband waveplate device may further include a power source configured to apply a potential difference between the first conductive layer and the antenna layer.

The power source may further include an adjuster configured to adjust a potential difference applied between the first conductive layer and the antenna layer.

The broadband waveplate device may further include a second conductive layer interposed between the first conductive layer and the multiple-quantum-well layer.

A bonding strength between the second conductive layer and the multiple-quantum-well layer may be greater than a bonding strength between the first conductive layer and the multiple-quantum-well layer.

The broadband waveplate device may further include an actuator located such that the first conductive layer is interposed between the actuator and the multiple-quantum-well layer, while the actuator is capable of adjusting a direction of the plurality of stripes of the antenna layer with respect to incident light.

According to another aspect of the present disclosure, a method of fabrication a broadband waveplate device includes forming, on a substrate, a multiple-quantum-well layer in which barrier layers and barrier layers are alternately stacked, forming a first conductive layer on the multiple-quantum-well layer, removing the substrate, forming a temporary conductive layer on a surface of the multiple-quantum-well layer in a direction facing away from the first conductive layer, forming a sacrificial layer on the temporary conductive layer, forming, in the sacrificial layer, a plurality of openings parallel to one another, forming an antenna layer having a shape of a plurality of stripes parallel to one another by removing portions of the temporary conductive layer exposed through the plurality of openings of the sacrificial layer, and removing the sacrificial layer.

An indium phosphide (InP) wafer, a gallium arsenide (GaAs) wafer, or a silicon (Si) wafer may be used as the substrate.

A silicon nitride layer may be used as the sacrificial layer.

The forming of the antenna layer may include simultaneously removing portions of a temporary conductive layer exposed through a plurality of openings in a sacrificial layer and portions of the multiple-quantum-well layer corresponding to the plurality of openings in the sacrificial layer.

The forming of the first conductive layer may include forming a second conductive layer on the multiple-quantum-well layer and forming the first conductive layer on the second conductive layer.

A bonding strength between the second conductive layer and the multiple-quantum-well layer may be greater than a bonding strength between the first conductive layer and the multiple-quantum-well layer.

Other aspects, features, and effects will be clearly understood from detailed descriptions, claims, and the accompanying drawings.

Advantageous Effects

According to an embodiment of the present disclosure, a broadband waveplate device having a simple configuration and usable for precise optical phase modulation and a broadband waveplate using the optical phase modulation according to applied voltages and a method of fabrication the broadband waveplate device may be implemented. However, the scope of the present disclosure is not limited thereto.

BEST MODE

Figure 1:
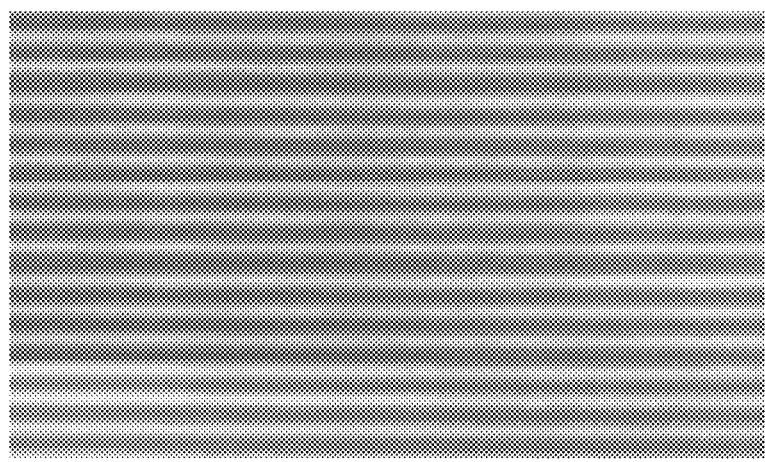
FIG. 1 is a photograph of a cross-section of a multiple-quantum-well layer according to an embodiment of the present disclosure.

As the present disclosure may allow various modifications and have numerous embodiments, some embodiments will be illustrated in the drawing and described in detailed description. Effects and characteristics of the present disclosure and methods of achieving the same will be clearly understood with reference to the embodiments described in detail in conjunction with the accompanying drawings. However, the present disclosure may have different forms and should not be construed as being limited to the embodiments disclosed hereinafter.

Hereinafter, embodiments of the present disclosure will be described in detail with reference to the accompanying drawings. Throughout the description, same reference numerals refer to same or corresponding components, and repeated descriptions thereof will be omitted.

In the embodiments, when a component such as a layer, a film, an area, or a plate is "on" another component, the component may be directly on the other component, or other components may be located therebetween. In addition, for convenience of description, sizes of the components may be exaggerated or reduced. For example, as sizes and thicknesses are arbitrarily shown for convenience of explanation, the present disclosure is not limited to the accompanying drawings.

In the following embodiments, the x axis, the y axis, and the z axis are not limited to three axes on an orthogonal coordinate system and may be interpreted as a broader sense. For example, the x axis, the y axis, and the z axis may be orthogonal to one another, but may also refer to different directions not orthogonal to one another.

FIG. 1 is a photograph of a cross-section of a multiple-quantum-well layer according to an embodiment of the present disclosure. The multiple-quantum-well layer may include at least one of GaN, AlN, InN, InGaN, AlGaN, InAlN, InAlGaN, AlAs, GaAs, GaP, InP, AlP, AlGaAs, AlInAs, InGaAs, AlGaP, AlInP, InGaP, AlInGap, AlInGaAs or AlInGaAsP. For example, the multiple-quantum-well layer may be based on heterojunction in which a material having a small band gap (e.g., InGaAs) and a material having a great band gap (e.g., AlInAs) are bonded to each other. For example, the multiple-quantum-well layer may be formed by forming barrier layers with AlInAs and forming well layers disposed between the barrier layers with InGaAs. However, the present disclosure is not limited thereto.

Figure 2:
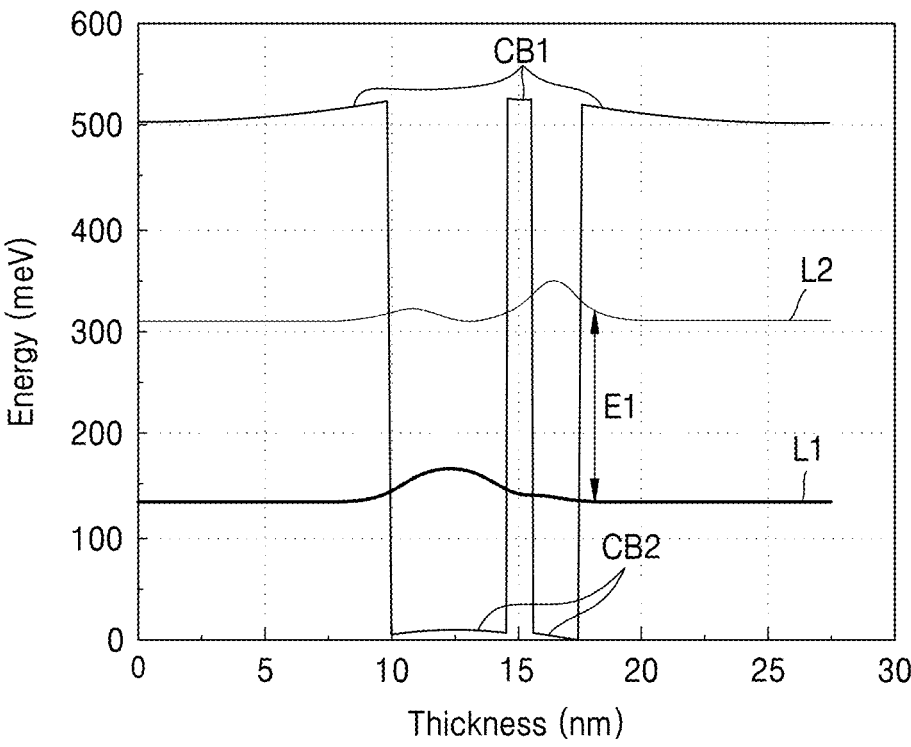
FIGS. 2 to 4 are graphs showing changes in wavelengths of light absorbed into a multiple-quantum-well layer according to change in a potential difference applied to two ends of the multiple-quantum-well layer.
Figure 3:
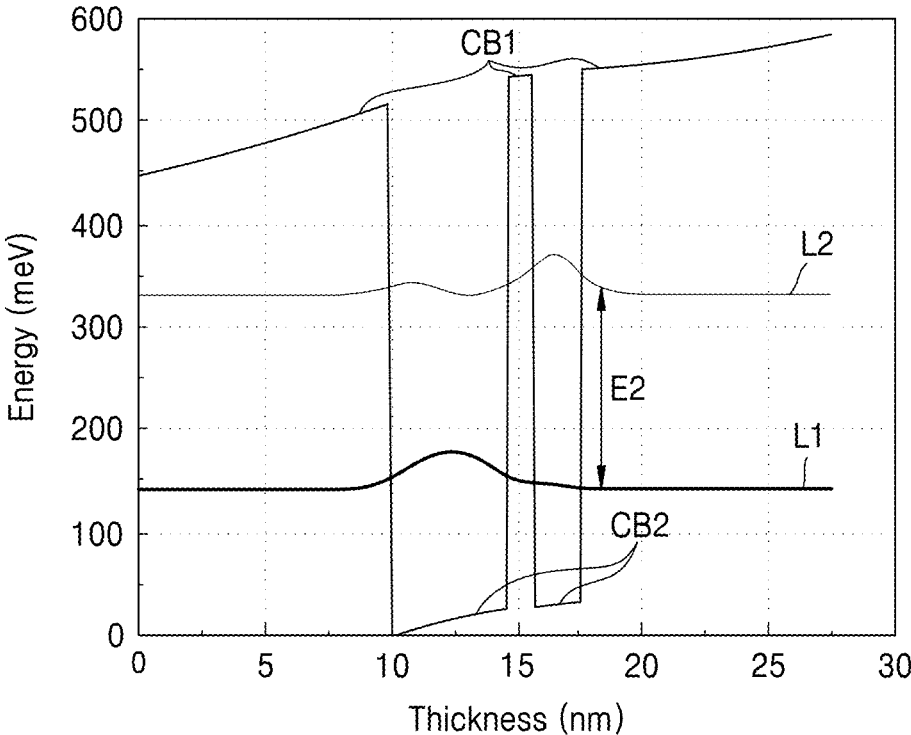
Figure 4:
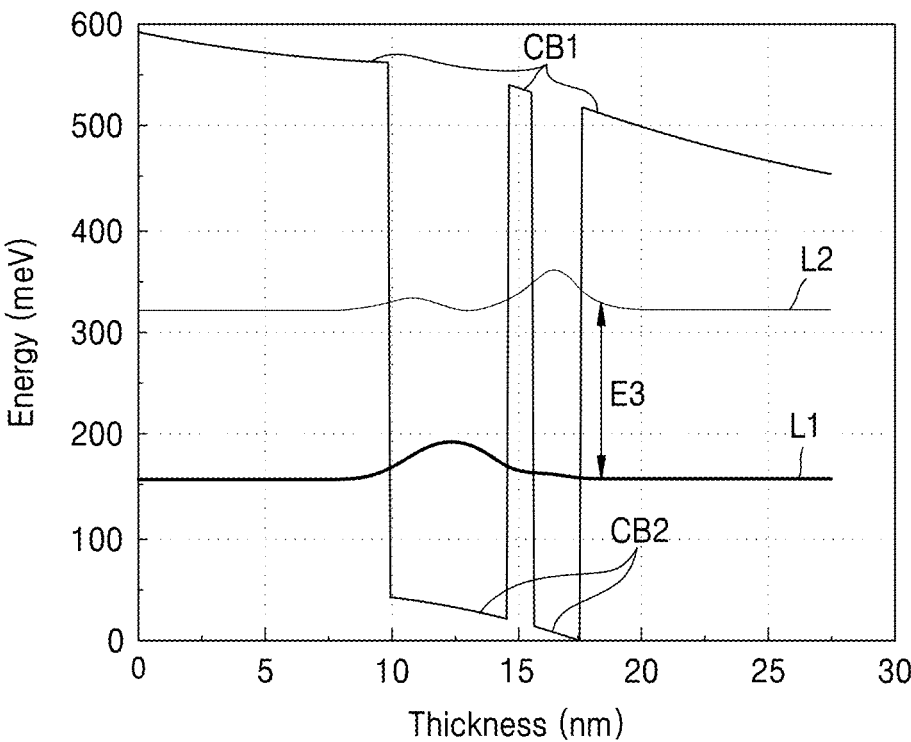

FIGS. 2 to 4 are graphs showing changes in wavelengths of light absorbed to the multiple-quantum-well layer according to changes in a potential difference applied to two ends of the multiple-quantum-well layer. FIGS. 2 to 4 are each a conduction band diagram of a portion of the multiple-quantum-well layer, i.e., a conduction band diagram of a portion in which two well layers are arranged among three barrier layers. In FIGS. 2 to 4, a horizontal axis indicate a thickness of each of the layers and a unit of the thickness is nm, and a vertical axis indicate energy and a unit of the energy is meV. Each of the barrier layers are formed of $Al_{0.48}In_{0.52}As$, and each of the well layers are formed of $In_{0.53}Ga_{0.47}As$.

The graphs in FIGS. 2 to 4 show the changes in the wavelength of light absorbed by the multiple-quantum-well layer when a potential difference applied to two ends of the multiple-quantum-well layer is changed, wherein the multiple-quantum-well layer has a structure repeated seven times, in which two well layers are arranged among three barrier layers, and thus has fourteen layers well layers arranged among fifteen barrier layers and a total thickness of 223 nm. That is, light having a frequency of w may be incident to the multiple-quantum-well layer and used for an electron subband shift in the multiple-quantum-well layer. For example, the light having the frequency of w may be used for an electron subband shift, e.g., shift from L1 to L2. The light having the frequency of w may be understood as being absorbed into the multiple-quantum-well layer. Here, the frequency w may vary according to change in the potential difference applied to the two ends of the multiple-quantum-well layer.

As shown in FIG. 2, when the potential difference is not applied to the two ends of the multiple-quantum-well layer, a conduction band CB1 of the barrier layer and a conduction band CB2 of the well layer has an approximately even shape. An electron absorbs energy of incident light in a state of having energy marked L1 and obtains energy marked with L2. A difference between the energy marked with L2 and the energy marked with L1 is 176 meV, and according to $E=hc/\lambda$, a wavelength of light corresponding to the difference is about 7 μm. That is, when the potential difference is not applied to the two ends of the multiple-quantum-well layer, the multiple-quantum-well layer absorbs light having a wavelength of 7 μm.

As shown in FIG. 3, when a potential difference of +1 V is applied to the two ends of the multiple-quantum-well layer, the conduction band CB1 of the barrier layer and the conduction band CB2 of the well layer has an inclined shape such that an energy level of a side corresponding to a higher potential is higher, as shown in FIG. 3. The electron absorbs the energy of the incident light in a state of having energy marked L1 and obtains the energy marked with L2. In a case as shown in FIG. 3, a difference between the energy marked with L2 and the energy marked with L1 is 188 meV, and according to $E=hc/\lambda$, a wavelength of the light corresponding to the difference is about 6.6 μm. That is, in the case as shown in FIG. 3, the multiple-quantum-well layer is configured to absorb light having a wavelength less than in the case as shown in FIG. 2 in which the potential difference is not applied to the two ends of the multiple-quantum-well layer.

As shown in FIG. 4, when a potential difference of −1 V is applied to the two ends of the multiple-quantum-well layer, the conduction band CB1 of the barrier layer and the conduction band CB2 of the well layer has an inclined shape such that an energy level of a side corresponding to a lower potential is lower, as shown in FIG. 4. Compared with the graph shown in FIG. 3, the energy level has a shape inclined in an opposite direction. The electron absorbs the energy of incident light in a state of having the energy marked with L1 and obtains the energy marked with L2. In the case as shown in FIG. 4, a difference between the energy marked with L2 and the energy marked with L1 is 164 meV, and according to E=hc/A, a wavelength of the light corresponding to the difference is about 7.5 μm. That is, in the case as shown in FIG. 4, the multiple-quantum-well layer is configured to absorb light having a wavelength greater than in the case as shown in FIG. 2 in which the potential difference is not applied to the two ends of the multiple-quantum-well layer.

As described above, by adjusting a potential difference applied to the two ends of the multiple-quantum-well layer, a wavelength of light absorbed into the multiple-quantum-well layer may be finely adjusted.

Figure 5:
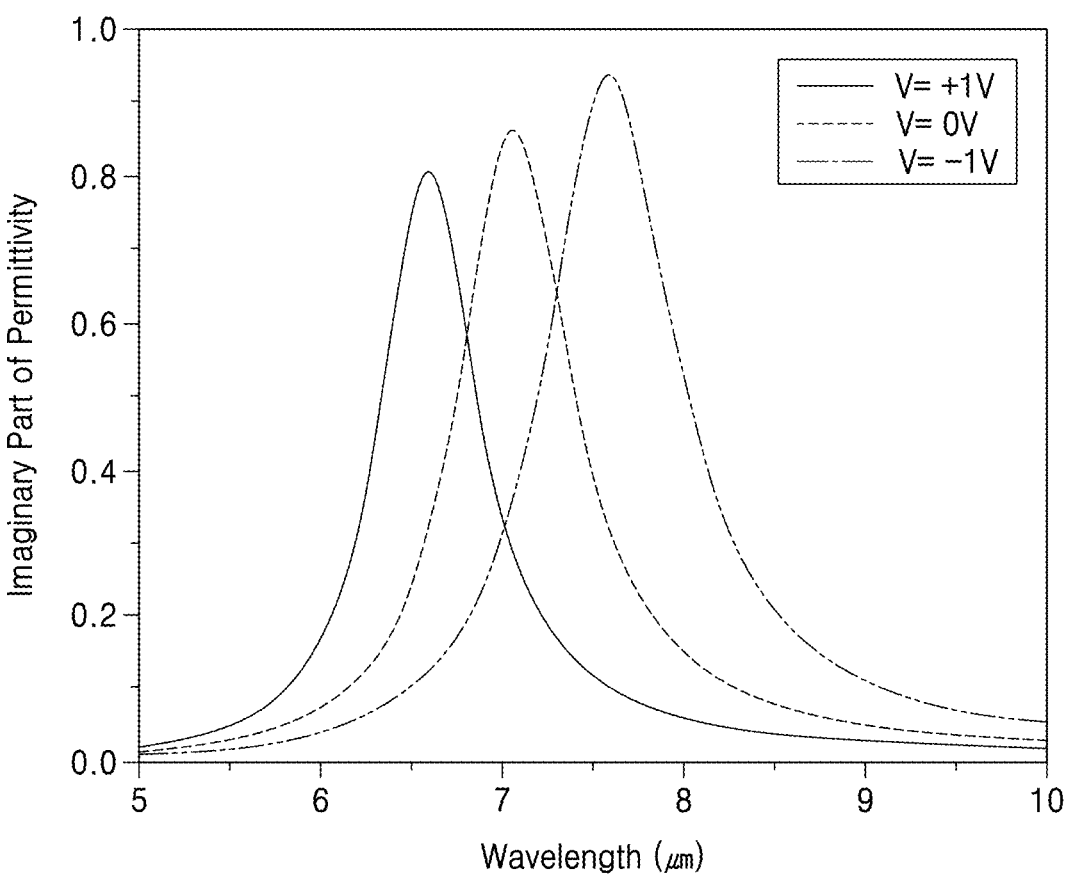
FIG. 5 is a graph showing changes in permittivity of cases shown in FIGS. 2 to 4.

FIG. 5 is a graph showing changes in permittivity of the multiple-quantum-well layer in the cases shown in FIGS. 2 to 4. A permittivity, which is a characteristic value indicating electrical characteristics of a dielectric material, e.g., an insulator, is defined by a complex number. A real part of the permittivity is an option related to a wavelength and propagation of an electromagnetic wave, and an imaginary part of the permittivity is an option related to loss of the electromagnetic wave. That is, the imaginary part of the permittivity of the multiple-quantum-well layer indicates a wavelength at which an incident light is absorbed. As shown in FIG. 5, a wavelength of the light absorbed into the multiple-quantum-well layer changes according to potential differences applied to the two ends of the multiple-quantum-well layer, and according to Kramers-Kronig relation expression, great changes may occur in the real part and the imaginary part of the permittivity of the multiple-quantum-well layer.

The descriptions with reference to FIGS. 2 to 4 will be applied to light in which an electromagnetic field oscillates in a direction perpendicular to a surface of the barrier layer of the multiple-quantum-well layer and which is incident in a direction parallel to the surface of the barrier layer. Accordingly, in the light incident in a direction perpendicular or oblique to the barrier layer and the antenna layer of the multiple-quantum-well layer, the electromagnetic field oscillates in a direction parallel to a surface of the antenna layer, and thus, an electromagnetic field in a direction perpendicular to an inner portion of the multiple-quantum-well layer between the antenna layer and the first conductive layer is induced. Therefore, by adjusting a direction in which the light is incident, a potential difference applied to the two ends of the multiple-quantum-well layer, and the like, a broadband waveplate device by which incident light is modulated to reflect light having desired characteristics may be implemented.

Figure 6:
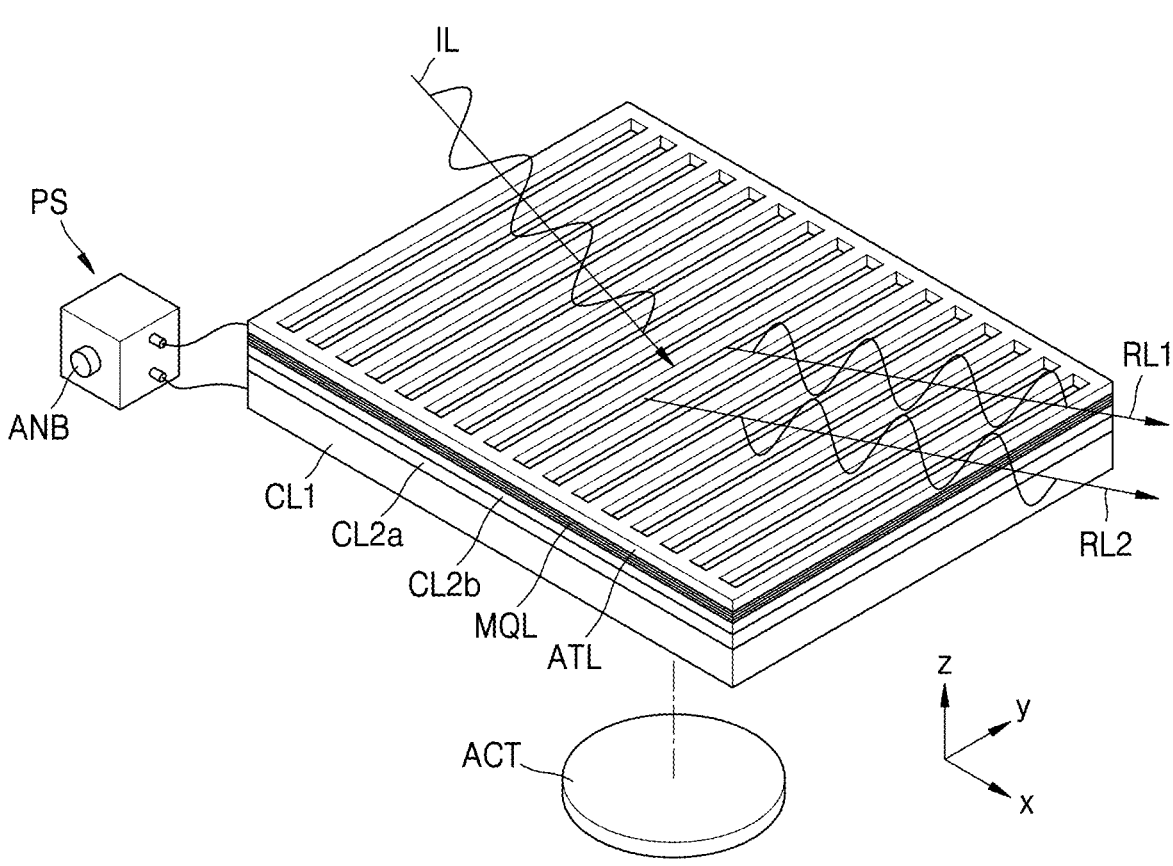
FIG. 6 is a perspective view schematically illustrating a broadband waveplate device according to an embodiment of the present disclosure.

FIG. 6 is a perspective view schematically illustrating a broadband waveplate device according to an embodiment of the present disclosure. The broadband waveplate device according to the present embodiment includes the multiple-quantum-well layer MQL as described above. The multiple-quantum-well layer MQL is above a first conductive layer CL1. The first conductive layer CL1 may include, for example, gold (Au), and may function as a first electrode of the broadband waveplate device. An antenna layer ATL is on the multiple-quantum-well layer MQL, and the antenna layer ATL may have a shape of a plurality of stripes parallel to one another (e.g., extending in a y axis direction). The antenna layer ATL may include, for example, Au, and may function as a second electrode of the broadband waveplate device. The antenna layer ATL may have a shape in which ends on one side (the −y direction) of the plurality of stripes are connected to one another and ends on another side (the +y direction) of the plurality of stripes are connected to one another. As shown in FIG. 6, the antenna layer ATL may have an integrally formed shape. In this case, the antenna layer ATL may also be understood to have a plurality of through holes having the shape of a plurality of stripes extending in a direction (the y axis direction).

The broadband waveplate device may further include second conductive layers CL2*a* and CL2*b* disposed between the first conductive layer CL1 and the multiple-quantum-well layer MQL. The second conductive layers CL2*a* and CL2*b* may have a multiple-layer structure. FIG. 6 illustrates that the second conductive layers CL2*a* and CL2*b* include a 2-1 conductive layer CL2*a* in a direction of the first conductive layer CL1 and a 2-2 conductive layer CL2*b* in a direction of the multiple-quantum-well layer MQL. The 2-1 conductive layer CL2*a* may include platinum (Pt), and the 2-2 conductive layer CL2*b* may include chromium (Cr). A bonding strength between the second conductive layers (i.e., the 2-1 conductive layer CL2*a* and the 2-2 conductive layer CL2*b*) and the multiple-quantum-well layer MQL, which is greater than a bonding strength between the first conductive layer CL1 and the multiple-quantum-well layer MQL, may increase a total bonding strength of the broadband waveplate device.

As shown in FIG. 6, linear-polarization incident light IL incident to the broadband waveplate device may adjust a phase of an x-axis polarization component of reflected light RL1 or RL2 according to the potential difference applied between the first conductive layer CL1 and the antenna layer ATL of the broadband waveplate device. FIG. 6 illustrates that the phase of the x-axis polarization component of the reflected light RL1 or RL2 may be adjusted to have different values according to the potential difference. However, this does not indicate that the incident light IL is simultaneously reflected as the reflected light RL1 and RL2 but indicates that the phase of the reflected light may be adjusted, for example, due to the potential difference applied between the first conductive layer CL1 and the antenna layer ATL of the broadband waveplate device.

MODE FOR INVENTION

Figure 7:
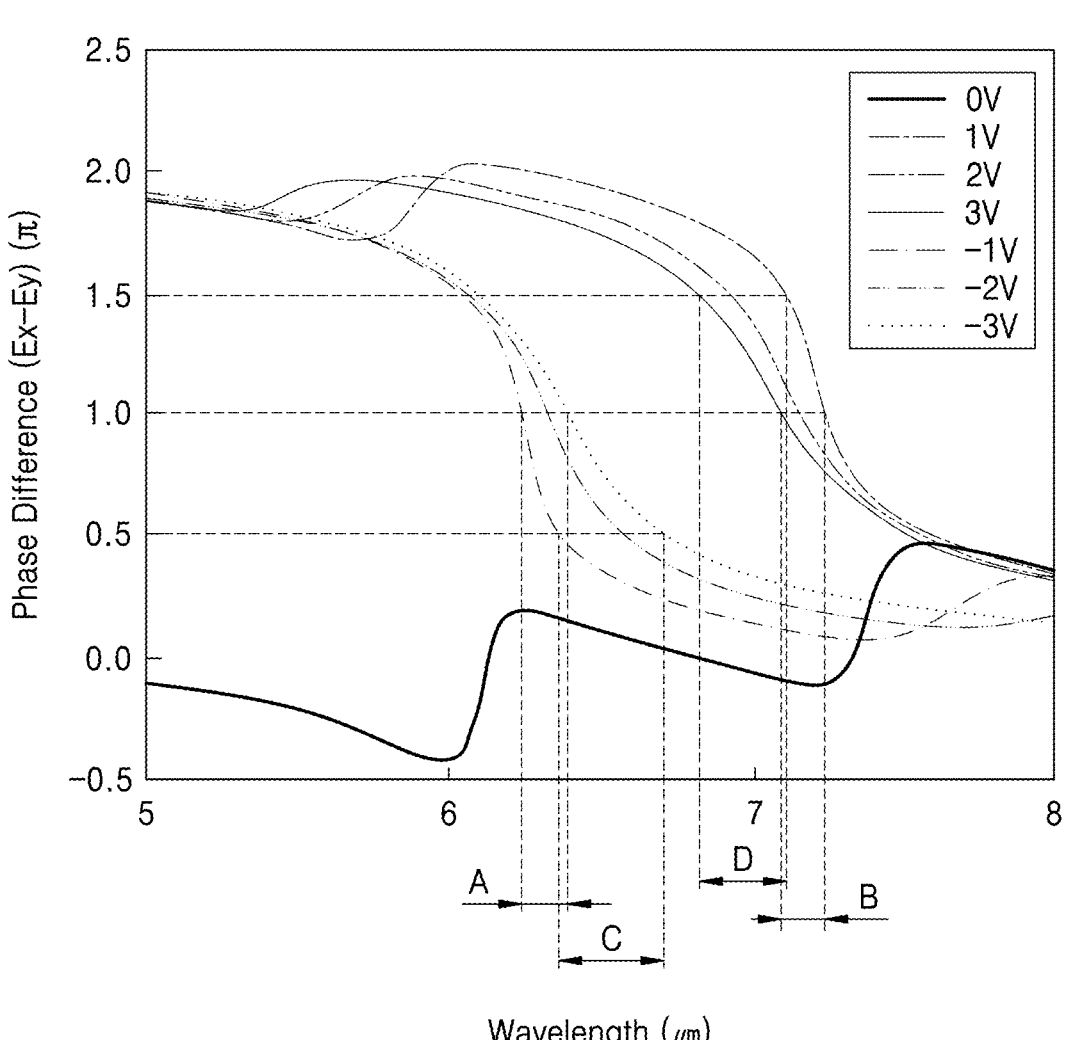
FIG. 7 is a graph showing an operation principle of the broadband waveplate device shown in FIG. 6.

FIG. 7 is a graph showing an operation principle of the broadband waveplate device shown in FIG. 6. A horizontal axis shown in FIG. 7 indicates a wavelength having a unit of μm, and a vertical axis indicates a difference between the phase of the x-axis polarization component and a phase of a y-axis polarization component of the reflected light having unit of TT. FIG. 7 illustrates a result of a case in which linearly polarized light is incident to the broadband waveplate device shown in FIG. 6 in 20 degrees in a direction from the x-axis toward the y-axis with respect to the stripe shape of the antenna layer ATL. In the graph shown in FIG. 7, for example, 0.5 on the vertical axis indicates that the difference between the phase in the x-axis direction and the phase in the y-axis direction of the reflected light is 0.5 π (a ¼ wavelength) and the reflected light is right-circularly polarized light, and 1 on the vertical axis indicate that the difference between the phase in the x-axis direction and the phase in the y-axis direction of the reflected light is π (a ½ wavelength) and the reflected light is linearly polarized light. 1.5 on the vertical axis indicates that the difference between the phase of the x-axis polarization component and the phase of the y-axis polarization component of the reflected light is 1.5 π, and the phase difference of 1.5 π indicates that the reflected light is a left-circularly polarized light.

As shown in FIG. 7, in a range of wavelengths from 6.24 µm to 6.39 µm, indicated by A, a voltage applied between the first conductive layer CL1 and the antenna layer ATL may be changed between −1 V and −3 V, such that the linearly polarized incident light is reflected to be linearly-polarized reflected light rotated by a certain degree on an xy plane. That is, the broadband waveplate device may operate as a λ/2 waveplate. In a range of wavelength from 7.10 µm to 7.24 µm, which is marked with B, the voltage applied between the first conductive layer CL1 and the antenna layer ATL may be changed between 1 V and 3 V, such that the linearly polarized incident light is reflected to be linearly polarized reflected light rotated by a certain degree on the xy plane. That is, the broadband waveplate device may operate as the λ/2 waveplate.

In a range of wavelength from 6.37 µm to 6.72 µm, which is marked with C, the voltage applied between the first conductive layer CL1 and the antenna layer ATL may be changed between-1 V to −3 V, such that the linearly-polarized incident light is reflected to be right-circularly polarized reflected light. That is, the broadband waveplate device may operate as a λ/4 waveplate. In a range of wavelength from 6.81 µm to 7.12 µm, the voltage applied between the first conductive layer CL1 and the antenna layer ATL may be changed between 1 V and 3 V, such that the linearly-polarized incident light may be reflected to be left-circularly polarized reflected light. That is, the broad-band waveplate device may operate as the λ/4 waveplate.

As described above, the broadband waveplate device according to one or more embodiments may be used as the λ/2 waveplate or the λ/4 waveplate, and furthermore, the phase of the reflected light may be precisely adjusted by adjusting the voltage applied between the first conductive layer CL1 and the antenna layer ATL.

For example, when the broadband waveplate device according to the present embodiment is used as the λ/2 waveplate, when a wavelength of the linear-polarized incident light is 6.24 µm (which corresponds to a lowest limit in the wavelength range marked with A), the potential difference of −1 V may be applied between the first conductive layer CL1 and the antenna layer ATL such that the reflected light is linear-polarized incident light rotated by a certain degree on the xy plane, and when the wavelength of the linear-polarized incident light is 6.39 µm (which corresponds to a highest limit of the wavelength range marked with A), the potential difference of −3 V may be applied between the first conductive layer CL1 and the antenna layer ATL such that the reflected light is linear-polarized incident light rotated by a certain degree on the xy plane. When the wavelength of the incident light linear-polarized in the x-axis direction is a wavelength between 6.24 µm and 6.39 µm, a corresponding potential difference between −3 V and −1 V may be applied between the first conductive layer CL1 and the antenna layer ATL such that the reflected light is linear-polarized reflected light rotated by a certain degree on the xy plane.

In a case where the broadband waveplate device according to the present embodiment is used as the λ/4 waveplate, when a wavelength of the linear-polarized incident light is 6.37 µm (which corresponds to a lowest limit of the wavelength range marked with C), a potential difference of −1 V may be applied between the first conductive layer CL1 and the antenna layer ATL such that the reflected light is right-circularly polarized incident light, and when the wavelength of the linear-polarized incident light is 6.72 µm (which corresponds to a highest limit of the wavelength range marked with C), a potential difference of −3 V may be applied between the first conductive layer CL1 and the antenna layer ATL such that the reflected light is right-circularly polarized reflected light. When the wavelength of the linear-polarized incident light is a wavelength between 6.37 µm and 6.72 µm, a corresponding potential difference between −3 V and −1 V may be applied between the first conductive layer CL1 and the antenna layer ATL such that the reflected light is accurately right-circularly polarized reflective light.

As described above, the broadband waveplate device may be used as the λ/2 waveplate or the λ/4 waveplate according to requirements. In addition, the broadband waveplate device may precisely modulate polarization characteristics of the reflected light with respect to a wide wavelength band.

As seen in FIG. 7, the wavelength range from 6.24 µm to 6.39 µm marked with A partially overlaps the wavelength range from 6.37 µm to 6.72 µm. In a case where the incident light of the overlapping wavelength range from 6.37 µm to 6.39 µm is linear-polarized light, as the voltage applied between the first conductive layer CL1 and the antenna layer ATL is changed from about-3 V to about-1 V, the reflected light may be linear-polarized reflected light rotated by a certain degree or right-circularly polarized light on the xy plane. The wavelength range from 7.10 µm to 7.24 µm marked with B partially overlaps a wavelength range from 6.81 µm to 7.12 µm marked with D. In a case where the incident light having an overlapping wavelength range from 7.10 µm to 7.12 µm is linear-polarized light, as the voltage applied between the first conductive layer CL1 and the antenna layer ATL is changed from about 1 V to about 3 V, the reflected light may be linear-polarized reflected light rotated by a certain degree or left-circularly polarized light on the xy plane. That is, the broadband waveplate device according to the present embodiment may be used, for incident light having a wavelength of a certain wavelength band, as a device for adjusting intensity of the reflected light using Pockels effect that is electrical modulation of the λ/2 waveplate and the λ/4 waveplate. In addition, as the Pockels effect is also used in a case of implementing laser having a high energy density, the broadband waveplate device according to one or more embodiments may also be used in a high-output laser device.

The broadband waveplate device according to the present embodiment may include a power source PS as shown in FIG. 6. The power source PS may be configured to apply a potential difference between the first conductive layer CL1 and the antenna layer ATL. The power source PS may have an adjuster ANB configured to adjust the potential difference applied between the first conductive layer CL1 and the antenna layer ATL. The potential difference applied between the first conductive layer CL1 and the antenna layer ATL may be adjusted using the adjuster ANB such that the broadband waveplate device may operate as the λ/4 waveplate or the λ/2 waveplate. In addition, the potential difference applied between the first conductive layer CL1 and the antenna layer ATL may be finely adjusted according to a wavelength of the incident light such that reflected light having a phase precisely adjusted as desired is emitted.

When seen in a direction (a z-axis direction) perpendicular to the top surface of the multiple-quantum-well layer MQL, it is required that a direction in which the incident light IL moves is adjusted to form a certain angle with a stripe pattern (having a shape extending in the y-axis direction) of the antenna layer ATL. This is because a phase of a component of the incident light IL in the direction (the y-axis direction) in which the shape of the stripes of the antenna layer ATL is not changed by the broadband waveplate device and only a phase of a component of the incident light IL in the direction (the x axis direction) perpendicular to the direction (the y axis direction) in which the stripe shape of the antenna layer ATL is changed by the broadband waveplate device. Accordingly, the broadband waveplate device may include an actuator ACT located such that the first conductive layer CL1 is interposed between the actuator ACT and the multiple-quantum-well layer MQL. The actuator ACT may be configured to adjust a direction of the plurality of stripes of the antenna layer ATL with respect to the incident light IL. For example, the actuator ACT may rotate the multiple-quantum-well layer MQL by a certain degree (on the xy plane). However, the present disclosure is not limited thereto, and a position of a light source may also be adjusted using the actuator.

FIGS. 8 to 12 are cross-sectional views schematically illustrating a process of fabrication the broadband waveplate device shown in FIG. 6.

Figure 8:
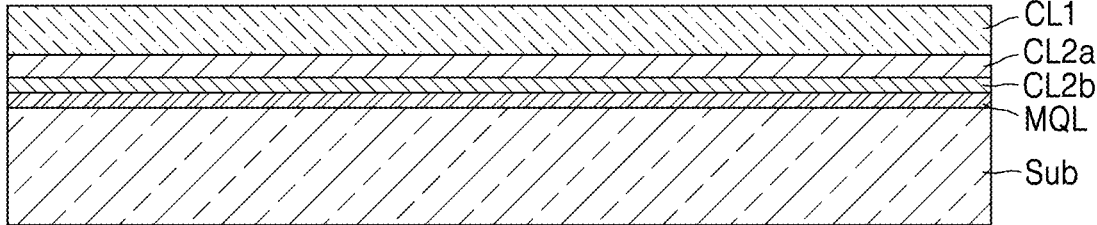
FIGS. 8 to 12 are cross-sectional views schematically illustrating a process of fabrication the broadband waveplate device shown in FIG. 6.

First, a stack structure as shown in FIG. 8 is formed. More particularly, the multiple-quantum-well layer MQL in which the well layers and the barrier layers are alternately stacked is formed on a substrate Sub. An InP wafer, a GaAs wafer, or a Si wafer may be used as the substrate Sub, AlInAs may be used as a material for the barrier layer, and InGaAs may be used as a material for the well layer. The barrier layer or the well layer may be formed by performing epitaxial growth through molecular beam epitaxy (MBE) or metal organic chemical vapor deposition (MOCVD) on the InP wafer.

The first conductive layer CL1 may be formed of a conductive material such as gold (Au) through deposition or sputtering on the multiple-quantum-well layer MQL. Before the forming of the first conductive layer CL1, the second conductive layers CL2a and CL2b may be formed on the multiple-quantum-well layer MQL. This is to improve the total bonding strength of the broadband waveplate device by forming the second conductive layers CL2a and CL2b using a material having a greater bonding strength with respect to the multiple-quantum-well layer MQL compared with the bonding strength between the multiple-quantum-well layer MQL and the first conductive layer CL1. The second conductive layer CL2a and CL2b may have a multi-layer structure, for example, the 2-2 conductive layer CL2b layer may be formed on the multiple-quantum-well layer MQL, and the 2-1 conductive layer CL2a may be formed on the 2-2 conductive layer CL2b. The 2-1 conductive layer CL2a may include platinum (Pt) having an excellent bonding strength with respect to the first conductive layer CL1, and the 2-2 conductive layer CL2b may include chromium (Cr) having an excellent bonding strength with respect to the multiple quantum-well layer MQL. The 2-2 conductive layer CL2b or the 2-1 conductive layer CL2a may be formed through deposition or sputtering.

Figure 9:
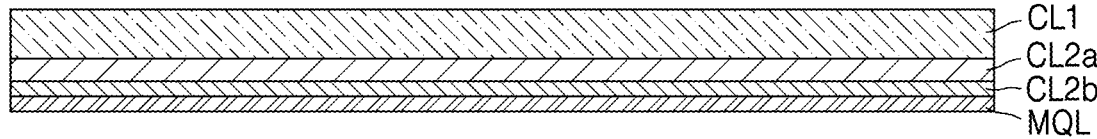

Thereafter, as shown in FIG. 9, the substrate Sub is removed to expose the multiple-quantum-well layer MQL. The removing of the substrate Sub may be performed through a physical method in which the substrate Sub is removed through physical polishing, and may also be performed through a chemical method in which the substrate Sub is immersed in an etchant.

Figure 10:
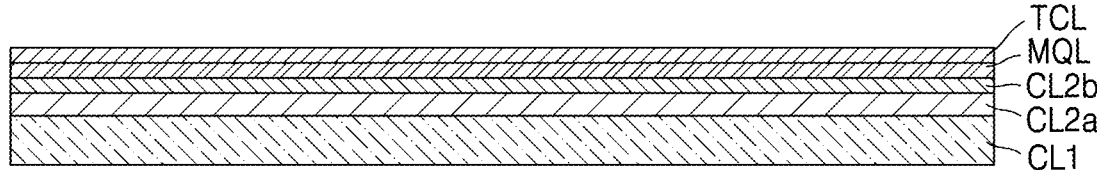
Figure 11:
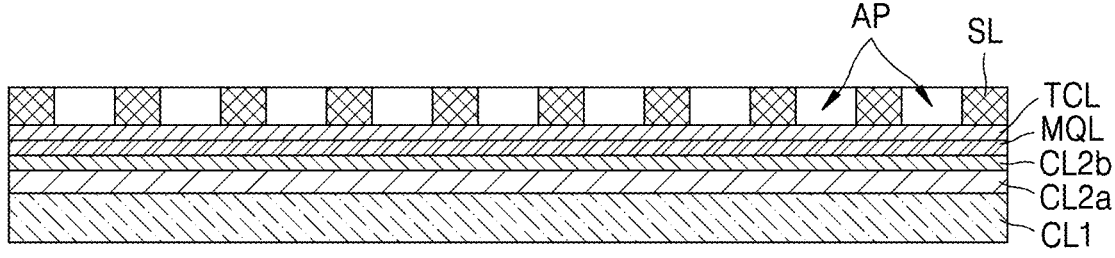

As shown in FIG. 10, a temporary conductive layer TCL is formed through deposition or sputtering on a surface of the multiple-quantum-well layer MQL in a direction facing away from the first conductive layer CL1, i.e., in a direction opposite to the direction to the first conductive layer CL1. The temporary conductive layer TCL may include, for example, gold (Au). As shown in FIG. 11, a sacrificial layer SL is formed on the temporary conductive layer TCL, and a plurality of openings AP parallel to one another are formed in the sacrificial layer SL. The sacrificial layer SL may include, for example, a photoresist, and the plurality of openings AP parallel to one another may be formed through exposure and development processes. In addition, the plurality of openings AP parallel to one another may also be formed by forming the sacrificial layer SL using silicon nitride and then removing certain portions of the sacrificial layer SL using a separate photoresist.

Figure 12:
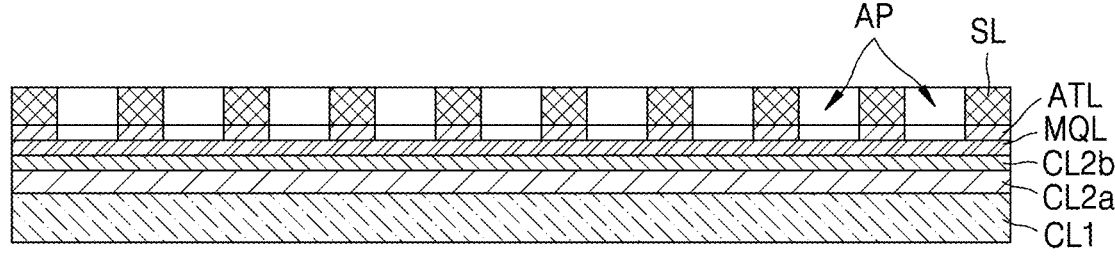

Next, portions of the temporary conductive layer TCL exposed through the plurality of openings AP in the sacrificial layer SL are removed to form the antenna layer ATL having the shape of the plurality of stripes parallel to one another, as shown in FIG. 12. By removing the sacrificial layer SL, the broadband waveplate device as described above with reference to FIG. 6 may be fabricated.

Figure 13:
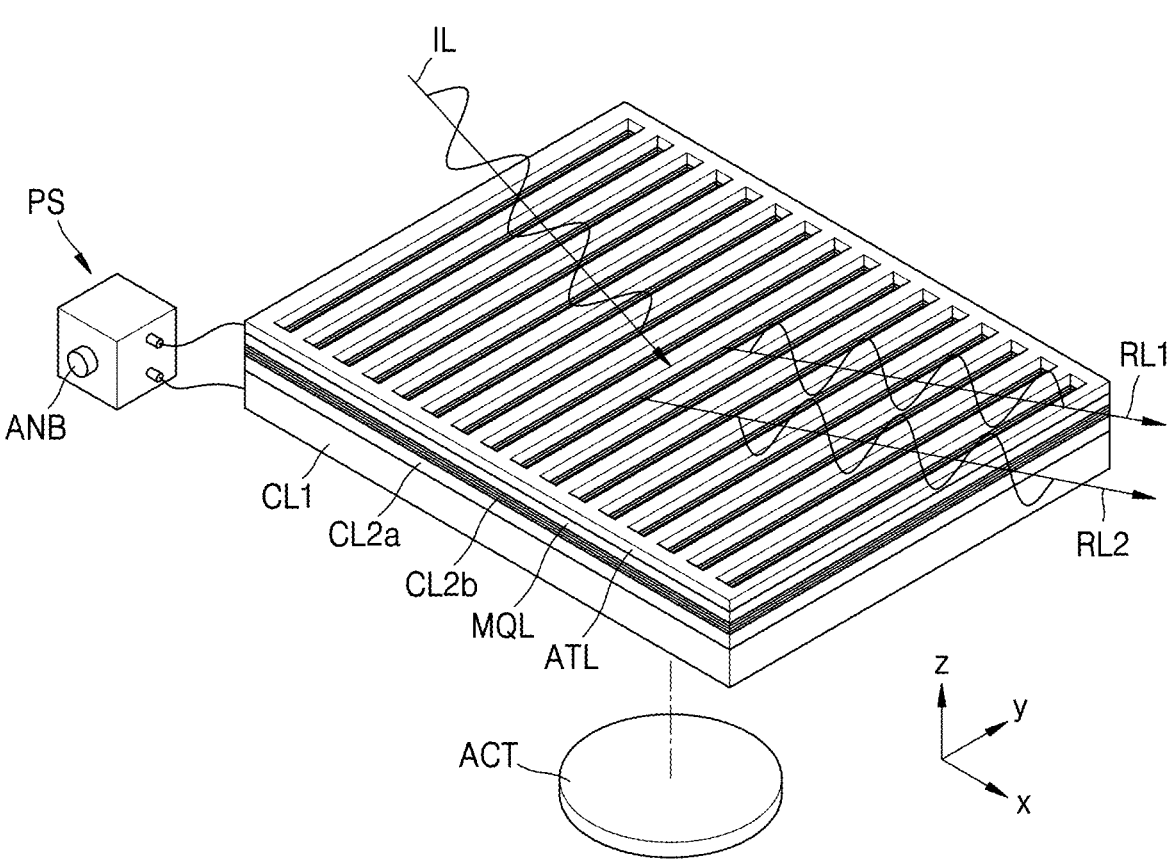
FIG. 13 is a perspective view schematically illustrating a broadband waveplate device according to another embodiment of the present disclosure.

FIG. 13 is a perspective view schematically illustrating a broadband waveplate device according to another embodiment of the present disclosure. The broadband waveplate device according to the present embodiment is different from the broadband waveplate device according to the embodiment described above with reference to FIG. 6 in that the multiple-quantum-well layer MQL is patterned into a shape corresponding to the shape of the antenna layer ATL. That is, the multiple-quantum-well layer MQL may also have the shape of the plurality of shapes parallel to one another (e.g., extending in the y-axis direction). The multiple-quantum-well layer MQL may have a shape in which ends on one side (the −y direction) of the plurality of stripes are connected to one another and ends on another side (the +y direction) of the plurality of stripes are connected to one another. The multiple-quantum-well layer MQL may have an integrally formed shape. In this case, the multiple-quantum-well layer MQL may also be understood to have a plurality of grooves or through holes having the shape of the plurality of stripes extending in a direction (the y-axis direction). In a fabrication process, when the antenna layer ATL is formed through the plurality of openings AP in the sacrificial layer SL as shown in FIG. 12, the portions of the temporary conductive layer TCL exposed through the plurality of openings in the sacrificial layer and the portions of multiple-quantum-well layer MQL corresponding to the plurality of openings AP in the sacrificial layer SL may be simultaneously removed.

In the broadband waveplate device according to the present embodiment, when a current flows between the first conductive layer CL1 and the antenna layer ATL due to the potential difference applied between the first conductive layer CL1 and the antenna layer ATL, the current may flow only in a direction (the z-axis direction) perpendicular to the multiple-quantum-well layer MQL without flowing in a direction in the xy plane in the multiple-quantum-well layer MQL, and therefore, the characteristics of the broadband waveplate device may be further improved.

Although the present disclosure has been described with reference to the embodiments shown in the accompanying drawings, the descriptions are only examples, and it will be understood by those of ordinary skill in the art that various modifications and other equivalent embodiments may be implemented from the present disclosure. Accordingly, the spirit and scope of the present disclosure will be defined based on the spirit and scope of the following claims.

INDUSTRIAL APPLICABILITY

The present disclosure may be used in the field of a broadband waveplate device based on optical phase modulation and the like.

The invention claimed is:

1. A broadband waveplate device comprising:

a first conductive layer;

a multiple-quantum-well layer in which well layers and barrier layers are alternately stacked, disposed on the first conductive layer; and an antenna layer disposed on the multiple-quantum-well layer and having a shape of a plurality of stripes parallel to one another, wherein the antenna layer has a shape in which ends at one side of the plurality of stripes are connected to one another and ends at another side of the plurality of stripes are connected to one another.

2. The broadband waveplate device of claim 1, wherein the antenna layer is integrally formed as a single body.

3. The broadband waveplate device of claim 1, wherein the multiple-quantum-well layer is patterned into a shape corresponding to a shape of the antenna layer.

4. The broadband waveplate device of claim 1, further comprising a power source configured to apply a potential difference between the first conductive layer and the antenna layer.

5. The broadband waveplate device of claim 4, wherein the power source further comprises an adjuster configured to adjust the potential difference applied between the first conductive layer and the antenna layer.

6. The broadband waveplate device of claim 1, further comprising a second conductive layer interposed between the first conductive layer and the multiple-quantum-well layer.

7. The broadband waveplate device of claim 6, wherein a bonding strength between the second conductive layer and the multiple-quantum-well layer is greater than a bonding strength between the first conductive layer and the multiple-quantum-well layer.

8. The broadband waveplate device of claim 1 further comprising an actuator located such that the first conductive layer is interposed between the actuator and the multiple-quantum-well layer, the actuator capable of adjusting a direction of the plurality of stripes of the antenna layer with respect to incident light.

9. A method of fabrication a broadband waveplate device, the method comprising:

forming, on a substrate, a multiple-quantum-well layer in which well layers and barrier layers are alternately stacked;

forming a first conductive layer on the multiple-quantum-well layer;

removing the substrate;

forming a temporary conductive layer on a surface of the multiple-quantum-well layer in a direction away from the first conductive layer;

forming a sacrificial layer on the temporary conductive layer;

forming, in the sacrificial layer, a plurality of openings parallel to one another;

forming an antenna layer having a shape of a plurality of stripes parallel to one another, by removing portions of the temporary conductive layer exposed through the plurality of openings of the sacrificial layer; and removing the sacrificial layer.

10. The method of claim 9, wherein an indium phosphide (InP) wafer, a gallium arsenide (GaAs) wafer, or a silicon (Si) wafer is used as the substrate.

11. The method of claim 9, where a silicon nitride layer is used as the sacrificial layer.

12. The method of claim 9, wherein the forming of the antenna layer comprises simultaneously removing portions of the temporary conductive layer exposed through the plurality of openings in the sacrificial layer and portions of the multiple-quantum-well layer corresponding to the plurality of openings in the sacrificial layer.

13. The method of claim 9, wherein the forming of the first conductive layer comprises forming a second conductive layer on the multiple-quantum-well layer and forming the first conductive layer on the second conductive layer.

14. The method of claim 13, wherein a bonding strength between the second conductive layer and the multiple-quantum-well layer is greater than a bonding strength between the first conductive layer and the multiple-quantum-well layer.

15. A broadband waveplate device comprising:

a first conductive layer;

a multiple-quantum-well layer in which well layers and barrier layers are alternately stacked, disposed on the first conductive layer;

an antenna layer disposed on the multiple-quantum-well layer and having a shape of a plurality of stripes parallel to one another; and an actuator located such that the first conductive layer is interposed between the actuator and the multiple-quantum-well layer, the actuator capable of adjusting a direction of the plurality of stripes of the antenna layer with respect to incident light.

* * * * *